United States Patent [19]

Rolland et al.

[11] Patent Number: 5,571,233

[45] Date of Patent: Nov. 5, 1996

[54] APPARATUS FOR FREEZING WATER IN A PIPE AT A GIVEN LOCATION

[76] Inventors: Mark Rolland; Joseph Ferris, both of 835 Lenox Ave., Apt. 301, Miami Beach, Fla. 33139

[21] Appl. No.: 578,355

[22] Filed: Dec. 26, 1995

[51] Int. Cl.$^6$ ..................................................... F25D 3/00
[52] U.S. Cl. ....................... 62/293; 165/46; 239/DIG. 12; 137/825
[58] Field of Search ................................. 62/293, 259.3; 165/46, 80.1; 137/825, 334; 239/DIG. 12; 607/96, 104, 108

[56] References Cited

U.S. PATENT DOCUMENTS

| | | | |
|---|---|---|---|
| 3,498,071 | 3/1970 | Tremont | 62/293 |
| 3,742,723 | 7/1973 | Grise | 62/293 |

*Primary Examiner*—John M. Sollecito

[57] ABSTRACT

An apparatus for freezing water in a pipe at a given location including a tank having an amount of pressurized gas disposed therein at a temperature below the freezing point of water; a valve coupled to the tank and openable for allowing the gas to be expelled; a flexible discharge hose having a proximal end coupled to the valve and a distal end extended therefrom; and a flow nozzle coupled to the distal end the discharge hose, each flow nozzle having a fabric sleeve, an elastomeric pad with a hollow interior slidably inserted within the sleeve, a plurality of through holes formed on one side of the pad, a tubular coupler having an inboard end secured to the pad and in communication with the interior and an outboard end removably coupled to the distal end of the hose, and a coupling mechanism secured to the sleeve for removably coupling the sleeve to the pipe, whereby when the flow nozzle is wrapped around the pipe and the valve is opened, gas flows through the discharge hose and out the flow nozzle for cooling the pipe and freezing water therein.

7 Claims, 3 Drawing Sheets

5,571,233

APPARATUS FOR FREEZING WATER IN A PIPE AT A GIVEN LOCATION

BACKGROUND OF THE INVENTION

1. Field of the Invention

The present invention relates to an apparatus for freezing water in a pipe at a given location and more particularly pertains to stopping flow of water within the pipe and thereby permitting the water line to be repaired at a downstream location with an apparatus for freezing water in a pipe at a given location.

2. Description of the Prior Art

The use of water line repair apparatuses is known in the prior art. More specifically, water line repair apparatuses heretofore devised and utilized for the purpose of repairing water lines are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,600,901 to Wagner discloses a gas balance control in flash freezing systems. U.S. Pat. No. 4,508,130 to Studer et al. discloses a method and apparatus for repairing water leaks. U.S. Pat. No. 4,552,183 to Chick discloses an apparatus for repairing leaks in pipe lines carrying fluent medium. U.S. Pat. No. 5,118,139 to Lott discloses a leak repair clamp. U.S. Pat. No. 5,186,215 to Gilleland discloses an apparatus for repairing pipe lines. U.S. Pat. No. 5,299,426 to Lermuzeaux discloses a freezing process and apparatus.

While these devices fulfill their respective, particular objective and requirements, the aforementioned patents do not describe an apparatus for freezing water in a pipe at a given location that is simple in design and uses pressurized gas maintained at below the freezing point of water for freezing water within a pipe at a given location and thus facilitate subsequent repair of such pipe.

In this respect, the apparatus for freezing water in a pipe at a given location according to the present invention substantially departs from the conventional concepts and designs of the prior art, and in doing so provides an apparatus primarily developed for the purpose of stopping flow of water within the pipe and thereby permitting the water line to be repaired at a downstream location.

Therefore, it can be appreciated that there exists a continuing need for new and improved apparatus for freezing water in a pipe at a given location which can be used for stopping flow of water within the pipe and thereby permitting the water line to be repaired at a downstream location. In this regard, the present invention substantially fulfills this need.

SUMMARY OF THE INVENTION

In the view of the foregoing disadvantages inherent in the known types of water line repair apparatuses now present in the prior art, the present invention provides an improved apparatus for freezing water in a pipe at a given location. As such, the general purpose of the present invention, which will be described subsequently in greater detail, is to provide a new and improved apparatus for freezing water in a pipe at a given location and method which has all the advantages of the prior art and none of the disadvantages.

To attain this, the present invention essentially comprises, in combination, a generally cylindrical rigid tank having a rounded upper extent, a flat lower extent, and an amount of pressurized freon gas disposed therein at a temperature below the freezing point of water. A one-way valve is included and coupled to the upper extent of the tank. The valve is openable for allowing the freon gas to be expelled from the tank. A temperature gauge mechanism is included and coupled to the one-way valve for allowing a temperature of the expelled freon gas to be visually monitored. A flexible discharge hose is included and has a proximal end coupled to the one-way valve with a hose clamp, a pair of tubular lines each terminated at a distal end, and a bifurcated intermediate portion therebetween.

A flow nozzle is coupled to each of the distal ends of each line of the discharge hose. Each flow nozzle has a rectangular fabric sleeve with a sealed tip end and an open end positioned oppositely therefrom. A thin elastomeric rectangular pad is slidably inserted within the sleeve. The pad has a hollow interior, a matrix of through holes formed on one side thereof for allowing communication with the interior, a tubular rigid coupler having an inboard end secured to the pad for allowing communication with the interior and an outboard end extended through the open end of the sleeve and removably coupled to one of the distal ends of the hose, and a series of spaced and parallel longitudinal manually-pliable metal wires disposed within and affixed to the sleeve in a juxtaposed relation with respect to the pad. The wires are formed with sufficient flexibility to allow the sleeve to be wrapped in a coiled shape about and in contact with a pipe and also formed with sufficient resiliency to allow the sleeve to maintain its coiled shape.

The flow nozzle also a strip of pile type fastener affixed to the sleeve near the tip end thereof and a strip of complementary pile type fastener affixed to the sleeve near the open end thereof. The strips are securable with each other to place the sleeve in a closed-loop configuration about the pipe. When one or both of the flow nozzles are wrapped around the pipe and the one-way valve is opened, freon gas flows through the discharge hose and the flow nozzle for cooling the pipe and freezing water therein.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved apparatus for freezing water in a pipe at a given location which has all the advantages of the prior art water line repair apparatuses and none of the disadvantages.

It is another object of the present invention to provide a new and improved apparatus for freezing water in a pipe at a given location which may be easily and efficiently manufactured and marketed.

It is a further object of the present invention to provide a new and improved apparatus for freezing water in a pipe at a given location which is of durable and reliable construction.

An even further object of the present invention is to provide a new and improved apparatus for freezing water in a pipe at a given location which is susceptible of a low cost of manufacture with regard to both materials and labor, and which accordingly is then susceptible of low prices of sale to the consuming public, thereby making such an apparatus for freezing water in a pipe at a given location economically available to the buying public.

Still yet another object of the present invention is to provide a new and improved apparatus for freezing water in a pipe at a given location which provides in the apparatuses and methods of the prior art some of the advantages thereof, while simultaneously overcoming some of the disadvantages normally associated therewith.

Even still another object of the present invention is to provide a new and improved apparatus for freezing water in a pipe at a given location for stopping flow of water within the pipe and thereby permitting the water line to be repaired at a downstream location.

Lastly, it is an object of the present invention to provide a new and improved apparatus for freezing water in a pipe at a given location comprising a tank having an amount of pressurized gas disposed therein at a temperature below the freezing point of water; a valve coupled to the tank and openable for allowing the gas to be expelled; a flexible discharge hose having a proximal end coupled to the valve and a distal end extended therefrom; and a flow nozzle coupled to the distal end the discharge hose, each flow nozzle having a fabric sleeve, an elastomeric pad with a hollow interior slidably inserted within the sleeve, a plurality of through holes formed on one side of the pad, a coupler having an inboard end secured to the pad and in communication with the interior and an outboard end removably coupled to the distal end of the hose, and coupling means secured to the sleeve for removably coupling the sleeve to the pipe, whereby when the flow nozzle is wrapped around the pipe and the valve is opened, gas flows through the discharge hose and the flow nozzle for cooling the pipe and freezing water therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
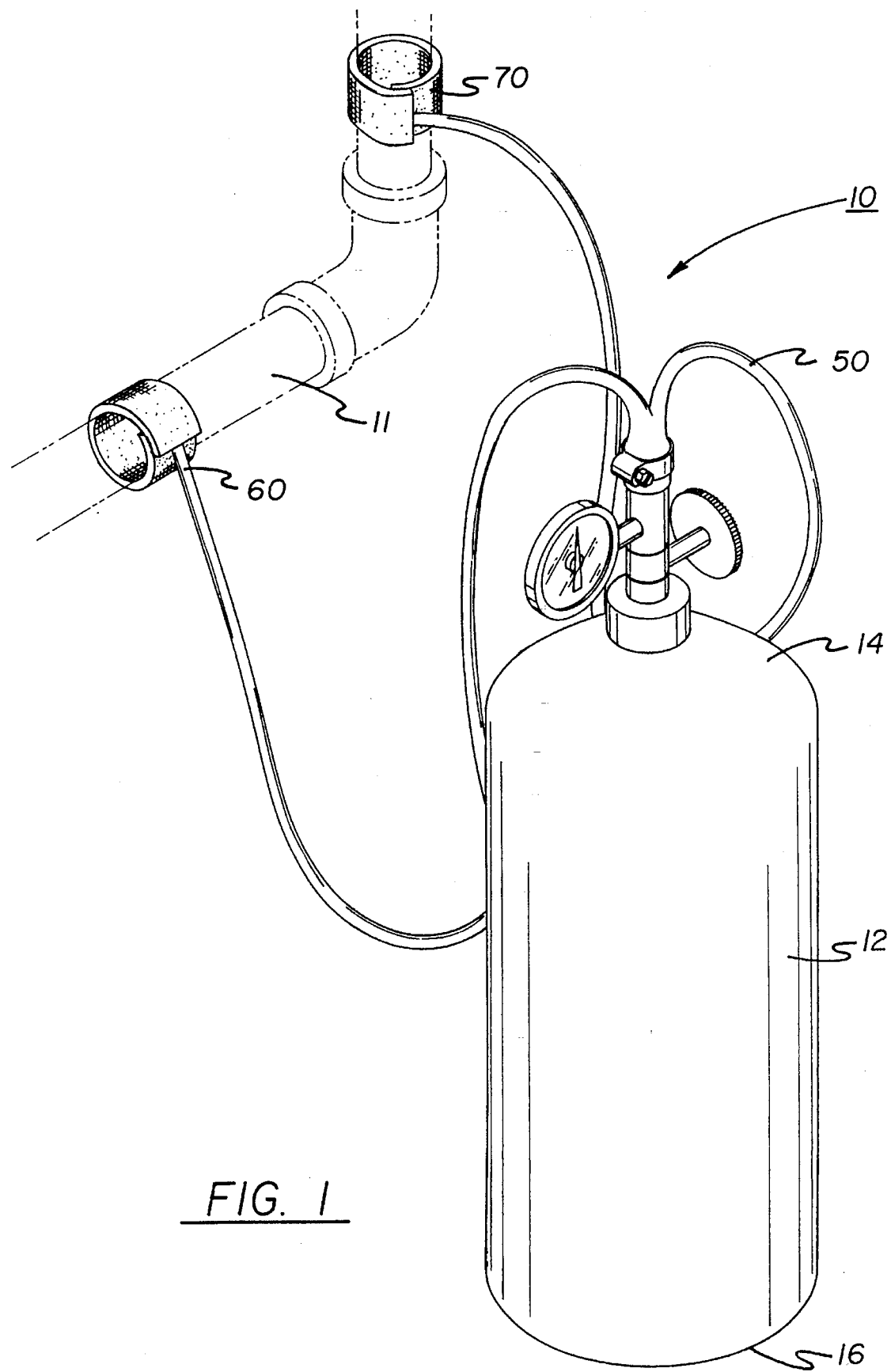
FIG. 1 is a perspective view of the preferred embodiment constructed in accordance with the principles of the present invention secured to a water line for use.
Figure 2:
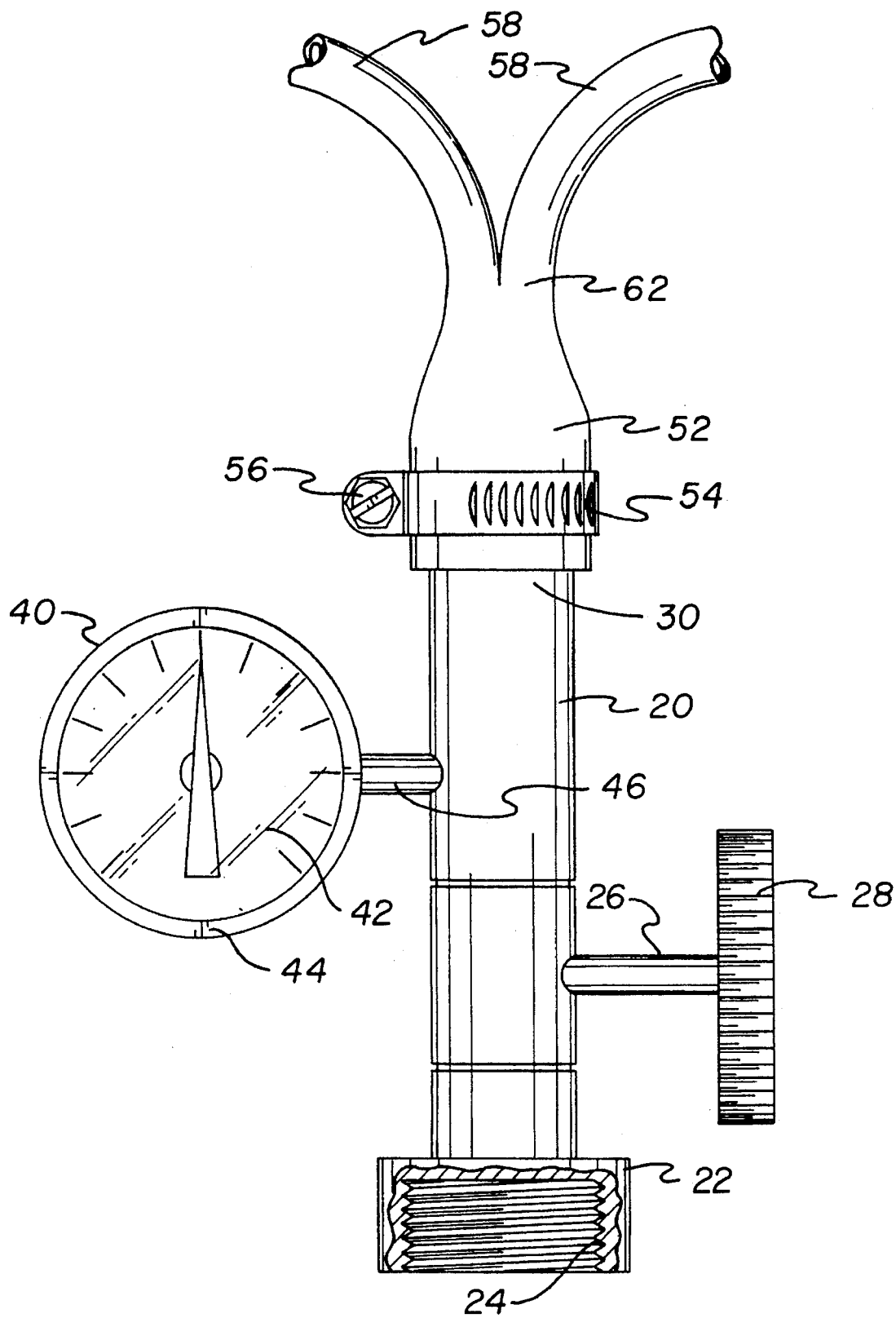
FIG. 2 is an enlarged side-elevational view of the one-way valve and temperature gauge of the present invention.
Figure 3:
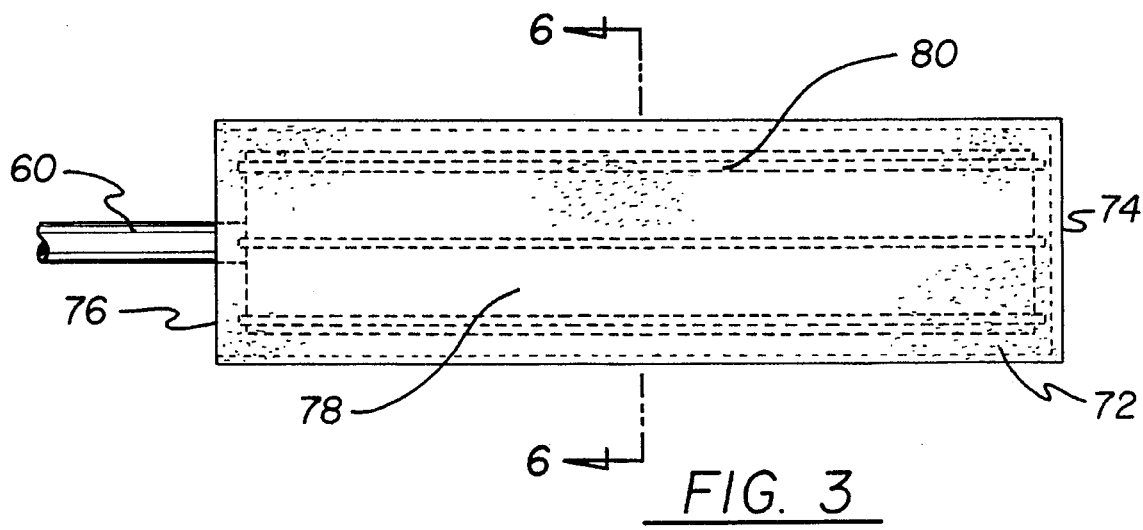
FIG. 3 is a front plan view of a flow nozzle of the present invention.
Figure 4:
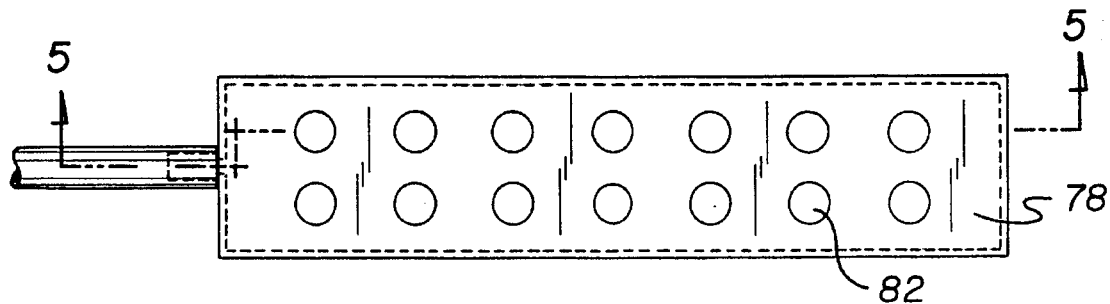
FIG. 4 is a rear plan view of a flow nozzle of the present invention.
Figure 5:
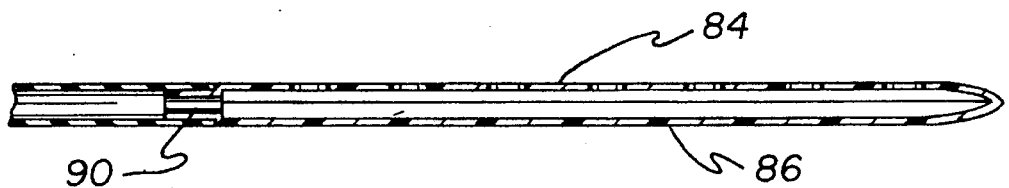
FIG. 5 is a cross-sectional view of a flow nozzle of the present invention taken along the line 5—5 of FIG. 4.
Figure 6:
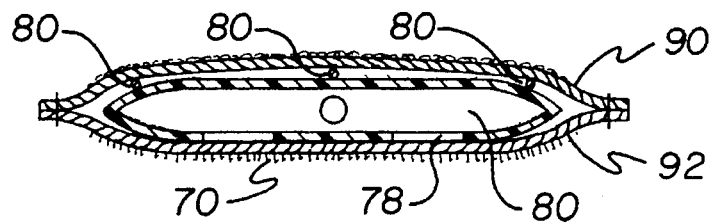
FIG. 6 is a cross-sectional view of a flow nozzle taken along the line 6—6 of FIG. 3.

With reference now to the drawings, and in particular, to FIG. 1 thereof, the preferred embodiment of the new and improved apparatus for freezing water in a pipe at a given location embodying the principles and concepts of the present invention and generally designated by the reference number 10 will be described.

The preferred embodiment of the present invention comprises a plurality of components. In their broadest context, such components include a tank, valve, temperature gauge, discharge hose, and flow nozzles. Such components are individually configured and correlated with respect to each other to provide a structure that allows water to be frozen within a water pipe 11 at a given location to thereby stop the flow of water within the pipe and facilitate repair of the pipe at a downstream location.

Specifically, the present invention includes a generally cylindrical and rigid metal tank 12. The tank has a rounded upper extent 14, a flat lower extent, and an amount of pressurized freon gas disposed therein. The temperature of the gas is maintained at a level well below the freezing point of water. Although freon gas is the preferred gas of choice, other inert gases such as nitrogen can be utilized. Preferably, the tank has an axial length of about one foot and a diameter of about three inches to facilitate its use in small areas.

A conventional metal one-way valve 20 is included. The valve has a lower threaded extent 22 threadably coupled to a threaded lip 24 on the tank 12. The valve is actuated through use of a thumbscrew 26 having a grippable knob portion 28. The knob portion is turnable by hand for allowing the freon gas from the tank to be expelled through upper tubular extent 30.

A conventional temperature gauge mechanism 40 is coupled to the one-way valve 20. The temperature gauge mechanism allows a temperature of the expelled freon gas to be visually monitored through a dial 42. The dial is held in a housing 44 and secured to the tubular extent 30 of the valve with a bushing 46.

A flexible rubber discharge hose 50 is provided and has a lower proximal end 52 coupled to the one-way valve with a metal hose clamp 54. The hose clamp 54 is tightened through use of bolt 56. The discharge hose also has a pair of tubular lines 58. Each line is terminated at a distal end 60. Lastly, an integral bifurcated intermediate portion 62 interconnects the proximal end 52 with the lines. The discharge hose thus allows release of freon from the tank to two locations as directed through the tubular lines. Each line 58 of the hose has an inside diameter of about ½ inch and a length of about five feet.

A flow nozzle 70 is coupled to each of the distal ends of each line of the discharge hose 50. Each flow nozzle has a rectangular nylon or cotton fabric sleeve 72. The rectangular sleeve has a short sealed tip end 74, long sealed side edges, and a short opened end 76 positioned oppositely therefrom. The sleeve has a length that is about 3½ times greater than its width to allow it to be wrapped around a pipe. A thin rubber or elastomeric rectangular pad 78 is slidably inserted within the sleeve. The pad has a hollow interior 80, and a matrix of circular through holes 82 formed thereon for allowing communication with the interior. The pad is formed of an upper rectangular layer having a peripheral edge integral with a peripheral edge of a rectangular lower layer 86. In addition, the flow nozzle includes a tubular rigid plastic coupler 90. The coupler has an inboard end secured to the pad for allowing communication with the interior and an outboard end extended through the open end 76 of the sleeve and removably coupled to one of the distal ends 60 of the hose.

Furthermore, a series of spaced and parallel longitudinal metal wires 80 are disposed within and affixed to an interior surface of the sleeve. The wires are formed of a manually-pliable metal. The wires are positioned in a juxtaposed relation with respect to the pad 78. The wires are formed of a metal with sufficient flexibility to allow the sleeve to be wrapped in a coil shape about and in contact with a pipe 11 and also formed with sufficient resiliency to allow the sleeve to maintain its coil shape. Preferably, a copper metal material is utilized. In addition, the flow nozzle includes a strip of pile-type fastener 90 that is sewn or adhered to an exterior surface of the sleeve near its tip end 74 and a strip of complimentary pile-type fastener 92 that is sewn or adhered to an opposing exterior surface of the sleeve near the open end 76. The strips are removably securable with each other to place the sleeve in a closed-loop configuration about the pipe 11. Thus, when one or both of the flow nozzles are wrapped around a pipe and the one-way valve 20 is opened, freon gas flows through the discharge hose and exits the through holes of the flow nozzle for cooling the pipe and freezing water therein.

The present invention allows water to be frozen in a metal pipe, thereby allowing a downstream leak on the pipe to be repaired. A gas of freon or near-type freon is released from the one-way valve of the tank and into two hoses that have flow nozzles secured around the pipe. The freon freezes the water in the pipe.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. An apparatus for freezing water in a pipe at a given location for stopping flow of water within the pipe and thereby permitting the water line to be repaired at a downstream location comprising, in combination:

a generally cylindrical rigid tank having a rounded upper extent, a flat lower extent, and an amount of pressurized freon gas disposed therein at a temperature below the freezing point of water;

a one-way valve coupled to the upper extent of the tank and openable for allowing the freon gas to be expelled;

temperature gauge means coupled to the one-way valve for allowing a temperature of the expelled freon gas to be visually monitored;

a flexible discharge hose having a proximal end coupled to the one-way valve with a hose clamp, a pair of tubular lines each terminated at a distal end, and a bifurcated intermediate portion therebetween; and a flow nozzle coupled to each of the distal ends of each line of the discharge hose, each flow nozzle having a rectangular fabric sleeve with a sealed tip end and an open end positioned oppositely therefrom, a thin elastomeric rectangular pad slidably inserted within the sleeve and having a hollow interior, a matrix of through holes formed on one side thereof for allowing communication with the interior, a tubular rigid coupler having an inboard end secured to the pad for allowing communication with the interior and an outboard end extended through the open end of the sleeve and removably coupled to one of the distal ends of the hose, and a series of spaced and parallel manually-pliable longitudinal metal wires disposed within and affixed to the sleeve in a juxtaposed relation with respect to the pad and with the wires formed with sufficient flexibility to allow the sleeve to be wrapped in a coiled shape about and in contact with a pipe and also formed with sufficient resiliency to allow the sleeve to maintain its coiled shape, the flow nozzle further including a strip of pile type fastener affixed to the sleeve near the tip end thereof and a strip of complementary pile type fastener affixed to the sleeve near the open end thereof, and with the strips securable with each other to place the sleeve in a closed loop configuration about the pipe, whereby when one of the flow nozzles is wrapped around the pipe and the one-way valve is opened, freon gas flows through the discharge hose and the flow nozzle for cooling the pipe and freezing water therein.

2. An apparatus for freezing water in a pipe at a given location comprising:

a tank having an amount of pressurized gas disposed therein at a temperature below the freezing point of water;

a valve coupled to the tank and openable for allowing the gas to be expelled;

a flexible discharge hose having a proximal end coupled to the valve and a distal end extended therefrom; and a flow nozzle coupled to the distal end the discharge hose, each flow nozzle having a fabric sleeve, an elastomeric pad with a hollow interior slidably inserted within the sleeve, a plurality of through holes formed on one side of the pad, a coupler having an inboard end secured to the pad and in communication with the interior and an outboard end removably coupled to the distal end of the hose, and coupling means secured to the sleeve for removably coupling the sleeve to the pipe, whereby when the flow nozzle is wrapped around the pipe and the valve is opened, gas flows through the discharge hose and the flow nozzle for cooling the pipe and freezing water therein.

3. The apparatus for freezing water in a pipe as set forth in claim 2 wherein the gas is freon.

4. The apparatus for freezing water in a pipe as set forth in claim 2 and further comprising:

temperature gauge means coupled to the one-way valve for allowing a temperature of the expelled gas to be visually monitored.

5. The apparatus for freezing water in a pipe as set forth in claim 2:

wherein the discharge hose is bifurcated; and wherein a flow nozzle is coupled to each distal end of the hose.

6. The apparatus for freezing water in a pipe as set forth in claim 2 wherein the coupling means includes:

a series of spaced metal wires disposed within and affixed to the sleeve in a juxtaposed relation with respect to the pad and with the wires formed with sufficient flexibility to allow the sleeve to be wrapped in a coiled shape about and in contact with a pipe and also formed with sufficient resiliency to allow the sleeve to maintain its coiled shape.

7. The apparatus for freezing water in a pipe as set forth in claim 2 wherein the coupling means includes:

a strip of pile type fastener affixed to the sleeve and a strip of complementary pile type fastener affixed to the sleeve, and with the strips securable with each other to place the sleeve in a closed loop configuration about the pipe.

\* \* \* \* \*